United States Patent
Gupta et al.

(10) Patent No.: US 10,042,659 B1
(45) Date of Patent: Aug. 7, 2018

(54) CACHING VIRTUAL CONTEXTS FOR SHARING OF PHYSICAL INSTANCES OF A HARDWARE RESOURCE

(71) Applicant: Xilinx, Inc., San Jose, CA (US)

(72) Inventors: Ashish Gupta, San Jose, CA (US); Hanh Hoang, Hayward, CA (US); Siva Prasad Gadey, Fremont, CA (US); Kiran S. Puranik, Fremont, CA (US)

(73) Assignee: XILINX, INC., San Jose, CA (US)

( * ) Notice: Subject to any disclaimer, the term of this patent is extended or adjusted under 35 U.S.C. 154(b) by 213 days.

(21) Appl. No.: 14/067,721

(22) Filed: Oct. 30, 2013

(51) Int. Cl.
*G06F 9/455* (2018.01)

(52) U.S. Cl.
CPC .............. *G06F 9/45533* (2013.01)

(58) Field of Classification Search
CPC .................................. G06F 9/45533
See application file for complete search history.

(56) References Cited

U.S. PATENT DOCUMENTS

| | | | | |
|---|---|---|---|---|
| 6,598,206 | B2* | 7/2003 | Darden et al. | 716/120 |
| 8,799,908 | B2* | 8/2014 | Arges et al. | 718/100 |
| 2005/0120160 | A1* | 6/2005 | Plouffe et al. | 711/1 |
| 2006/0238625 | A1* | 10/2006 | Sasaki et al. | 348/231.3 |
| 2007/0091101 | A1* | 4/2007 | Huang et al. | 345/506 |
| 2008/0104591 | A1* | 5/2008 | McCrory et al. | 718/1 |
| 2008/0201561 | A1* | 8/2008 | Bates | G06F 9/4881 712/228 |
| 2009/0172667 | A1* | 7/2009 | Wang et al. | 718/1 |
| 2013/0067267 | A1* | 3/2013 | Tamhane et al. | 714/4.11 |
| 2014/0237151 | A1* | 8/2014 | Jacobs et al. | 710/268 |
| 2014/0280800 | A1* | 9/2014 | Verchere et al. | 709/221 |
| 2014/0281604 | A1* | 9/2014 | Martin | 713/320 |
| 2014/0344828 | A1* | 11/2014 | Brown et al. | 718/104 |
| 2015/0116310 | A1* | 4/2015 | Baudouin et al. | 345/419 |

OTHER PUBLICATIONS

Tierney S. Embedded System [e-book]. Delhi: English Press; 2011. Available from: eBook Collection (EBSCOhost), Ipswich, MA. Accessed Jul. 30, 2015.*
Xilinx, Using Block RAM in Spartan-3 Generation FPGAs, Mar. 1, 2005.*
LogiCORE IP AXI DMA, 2011.*
EX8200 Ethernet, Jul. 2013.*
Advanced Digital Design, Hai Zhou, 2011.*
Nickolls, John. "GPU parallel computing architecture and CUDA programming model." Hot Chips 19 Symposium (HCS), 2007 IEEE. IEEE, 2007.*

* cited by examiner

*Primary Examiner* — Charlie Sun
(74) *Attorney, Agent, or Firm* — Kin-Wah Tong; Robert M. Brush

(57) ABSTRACT

A method for providing access by a virtual context to a physical instance includes receiving a request to access a physical instance of a plurality of physical instances of a hardware resource of a device. The request is associated with a virtual machine of a plurality of virtual machines. The method next determines that one of the physical instances is available, and assigns a virtual context associated with the virtual machine to access the one of the physical instances when the one of the physical instances is available. The assigning comprises retrieving the virtual context from a memory of the device and loading the virtual context into the one of the physical instances. The method then stores the virtual context in the memory after the one of the physical instances is accessed by the virtual context.

18 Claims, 3 Drawing Sheets

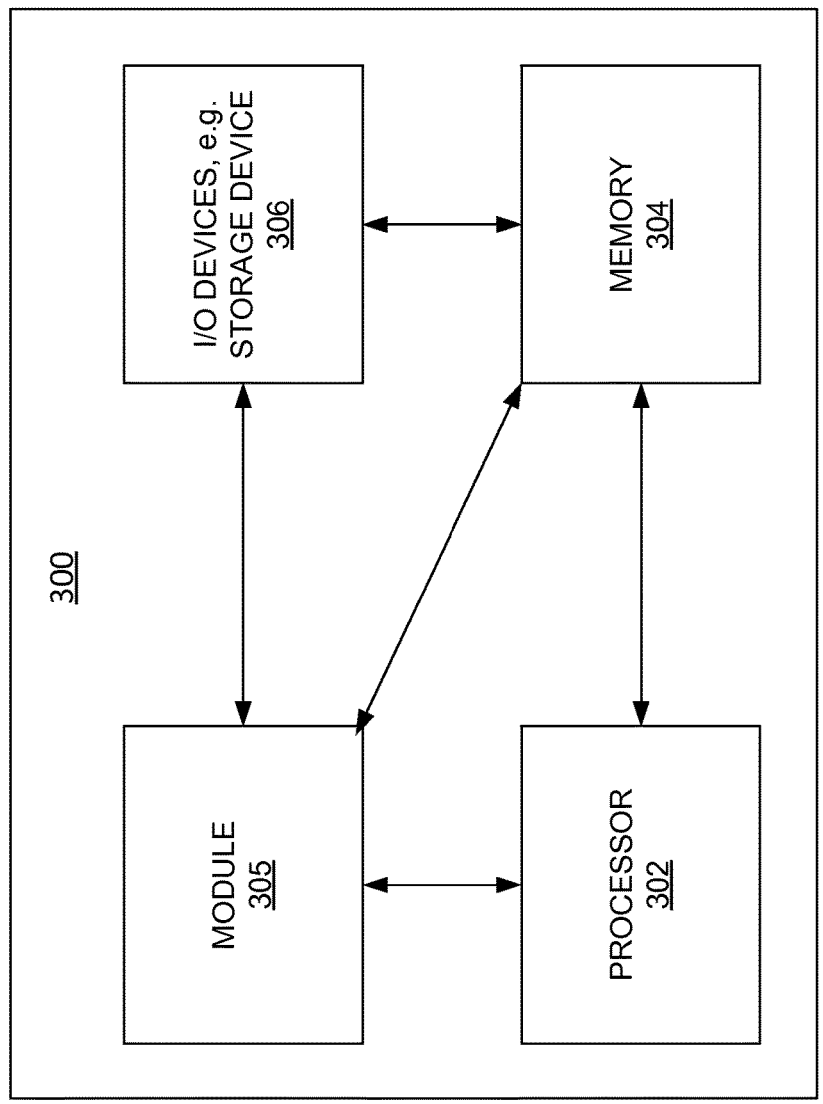

CACHING VIRTUAL CONTEXTS FOR SHARING OF PHYSICAL INSTANCES OF A HARDWARE RESOURCE

TECHNICAL FIELD

The present disclosure relates generally to virtualization using guest operating systems and the sharing of one or more physical resources of a shared resource device among a larger number of virtual contexts.

BACKGROUND

System virtualization, the use of multiple virtual machines implemented with a hypervisor on a single host, has grown significantly in recent years. Virtualization allows multiple virtual machines to access shared physical resources while providing an illusion of exclusivity. Typically, a virtual machine manager (VMM) or hypervisor provides a simulation of the underlying hardware, while coordinating access to shared resources among different virtual machines, e.g., guest operating systems (OS's) and applications. For input/output (I/O) operations, the hypervisor facing the virtual machines emulates the input/output device, while the hypervisor also includes a driver for interfacing with the physical input/output device. The hypervisor receives input/output commands for different virtual machines, coordinates the commands, and creates a single input/output stream for sending to the input/output device.

In a more recent approach, virtual machines may have direct access to certain underlying physical resources, including input/output devices, without having to pass through the hypervisor. In addition, systems are now often being optimized specifically for virtualization environments. For example, multiple instances of a single physical resource may be designed into the system and made available for use by different virtual machines. In some cases, it is desirable to have as many instances of the hardware, i.e., a number of copies of a single physical resource, as there are virtual machines in order to have maximum accessibility. However, not all virtual machines require the physical resource at the same time.

SUMMARY

The present disclosure provides a method for providing access by a virtual context to a physical instance. For example, the method includes receiving a request to access a physical instance of a plurality of physical instances of a hardware resource of a device. The request is associated with a virtual machine of a plurality of virtual machines. The method next determines that one of the plurality of physical instances is available. The method then assigns a virtual context associated with the virtual machine to access the one of the plurality of physical instances when the one of the plurality of physical instances is available. The assigning comprises retrieving the virtual context from a memory of the device and loading the virtual context into the one of the plurality of physical instances. The method then stores the virtual context in the memory after the one of the plurality of physical instances is accessed by the virtual context.

In various exemplary methods: the request is received from the virtual machine; the method further includes notifying the virtual machine that the virtual context has been stored in the memory; the virtual context is one of a plurality of virtual contexts; a number of the plurality of virtual contexts is greater than a number of the plurality of physical instances of the hardware resource; each virtual context of the plurality of virtual contexts is assigned to one of the plurality of virtual machines; each virtual machine of the plurality of virtual machines accesses the device without passing communications via a hypervisor; the request is received by a scheduler of the device; the assigning is based on at least one of a time at which the request is received, a frequency of previous accesses for the virtual context, a priority associated with the request, a priority associated with the virtual context, or an anticipated duration of the access; the assigning is based on at least one of a number of pending requests to access a physical instance of the plurality of physical instances, a number of the plurality of physical instances that are currently occupied, or a number of the plurality of physical instances that are scheduled to be occupied; and/or the method includes switching off a power signal to at least one of the plurality of physical instances when a number of requests for access to a physical instance of the plurality of physical instances is below a threshold.

The present disclosure also provides a device that includes a processor and a computer-readable medium that stores instructions. When executed by the processor, the instructions cause the processor to perform operations. The operations include receiving a request to access a physical instance of a plurality of physical instances of a hardware resource of a device. The request is associated with a virtual machine of a plurality of virtual machines. The operations further include determining that one of the plurality of physical instances is available, and assigning a virtual context associated with the virtual machine to access the one of the plurality of physical instances when the one of the plurality of physical instances is available. The assigning comprises retrieving the virtual context from a memory of the device and loading the virtual context into the one of the plurality of physical instances. The operations also include storing the virtual context in the memory after the one of the plurality of physical instances is accessed by the virtual context.

In various exemplary devices: the request is received from the virtual machine; the operations further include notifying the virtual machine that the virtual context has been stored in the memory; and/or the virtual context is one of a plurality of virtual contexts; a number of the plurality of virtual contexts is greater than a number of the plurality of physical instances of the hardware resource.

The present disclosure further provides a device that includes a plurality of physical instances of a hardware resource, a scheduler, for scheduling access to the plurality of physical instances by a plurality of virtual contexts, and a memory storing the plurality of virtual contexts, wherein each virtual context of the plurality of virtual contexts is assigned to a different virtual machine of a plurality of virtual machines.

In various exemplary devices: the device comprises a direct memory access logic device; the hardware resource comprises a data mover; the device comprises a network interface card; the hardware resource comprises a network processing unit; the device comprises an application specific integrated circuit; the plurality of physical instances of the hardware resource comprises random logic; the memory comprises static random access memory; the device comprises a field programmable gate array; the plurality of physical instances of the hardware resource comprises lookup tables; and/or the memory comprises block random access memory.

BRIEF DESCRIPTION OF THE DRAWINGS

Accompanying drawings show exemplary devices, systems, and methods in accordance with one or more aspects

FIG. 3 illustrates a high level block diagram of a general purpose computer, or a computing device suitable for use in performing the functions described herein.

To facilitate understanding, identical reference numerals are used, where possible, to designate identical elements that are common to the figures.

DETAILED DESCRIPTION

In a virtualization environment, a number of virtual machines may share a single physical platform, e.g., a computer, which includes a shared resource hardware device. The present disclosure provides for the sharing of a number of physical instances of a shared resource hardware device among a potentially larger number of virtual machines/virtual contexts in a time-sliced manner. The physical instances are provided through real logic gates and registers of the shared resource hardware device for holding data of a virtual context that is actively being processed. Each virtual machine is assigned a virtual context which is stored in a dense memory of the shared resource hardware device. When the virtual context requires active manipulation, it can be restored or cached into a physical instance to be worked on, and stored back into the dense memory when the work is complete.

By saving and restoring virtual contexts in this manner, a larger number of virtual machines may be hosted by a single system, while sharing a smaller number of identical copies of a hardware resource. To arbitrate among different requests to access the physical instances, a sharing algorithm is implemented on the shared resource hardware device for determining which virtual contexts are saved in memory and which virtual contexts are restored from memory and loaded into a physical instance.

Figure 1:
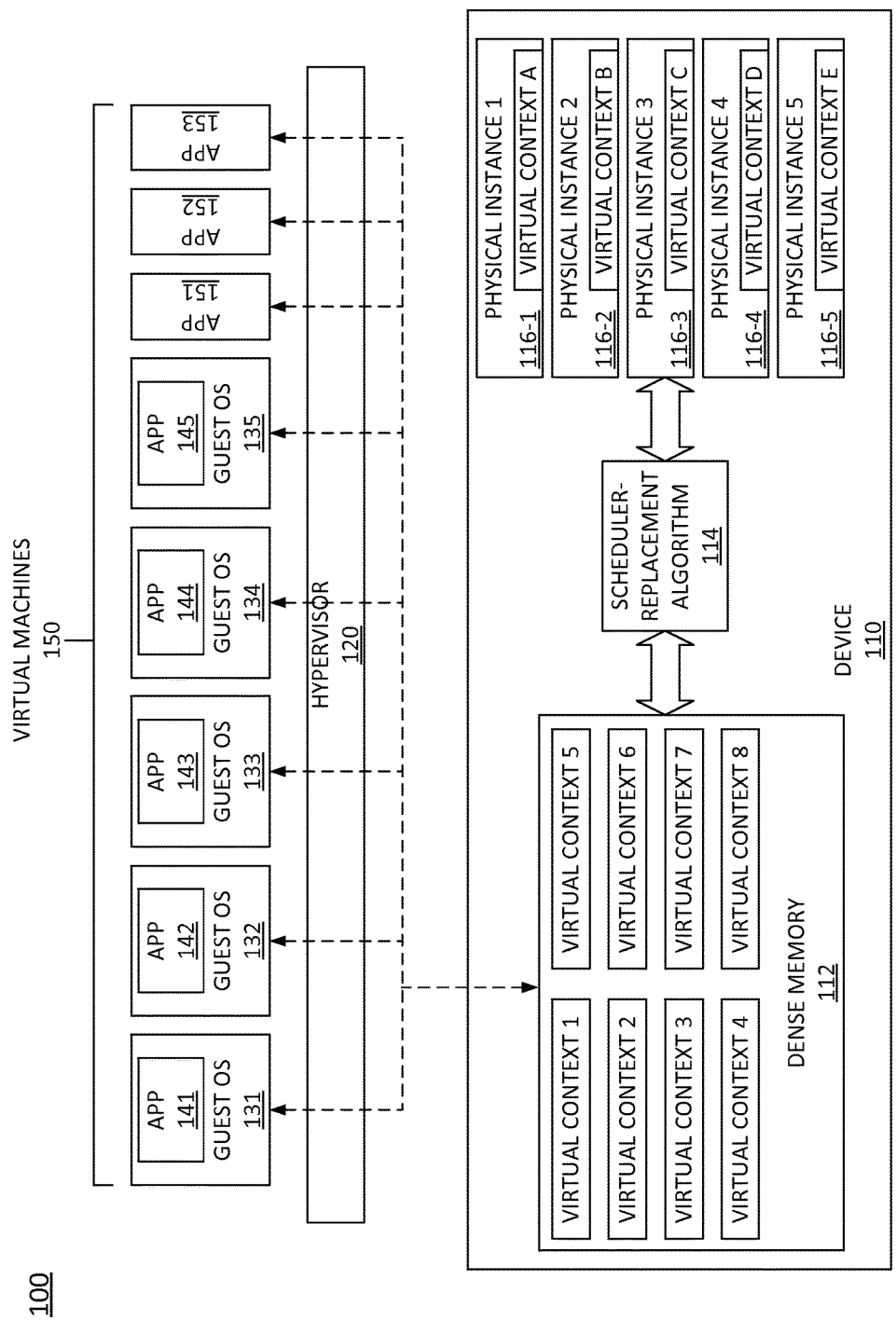
FIG. 1 illustrates a block diagram of a computing device/system.

To better understand the present disclosure, FIG. 1 illustrates a high level block diagram of a device or computing system 100. Computing system 100 may include various components which are not necessary to illustrate the principles of the present disclosure and which are omitted for clarity. For example, the computing system 100 may include a central processing unit (CPU) with one or more cores, system busses, a main memory, one or more storage devices, such as read only memory (ROM), user input/output devices such as a monitor, keyboard a mouse, and so forth. In one example, each of the components of computing system 100 resides in a single housing or a single unit. For example, the computing device 100 may comprise a single personal computer, laptop computer, smart phone, tablet, server, and the like.

As illustrated in FIG. 1, computing system 100 includes a shared resource hardware device 110. In some examples, shared resource hardware device 110 may comprise an input/output device, which in the present context is any device/component which comprises part of the computing system 110 and which is accessible by one or more other components of the system, e.g., over a shared bus or other connection (in other words, it is not limited to user I/O devices). To illustrate, the shared resource hardware device 110 may comprise direct memory access (DMA) logic or a network interface card (NIC), a mathematical logic device, a deep packet inspection device, and so forth.

The shared resource hardware device 110 includes a memory 112, e.g., a dense memory, a scheduler 114 for executing a sharing/replacement algorithm and a plurality of physical instances 116-1 to 116-5. The example of FIG. 1 illustrates five physical instances. However, the present disclosure is not limited to any particular number of physical instances. In fact, in different examples, a desired number of physical instances may be selected at the design stage depending upon different parameters, such as the cost, the number of anticipated virtual machines 150 sharing the physical instances, and so forth. This aspect of the disclosure is discussed in greater detail below.

Each of the physical instances 116-1 to 116-5 comprises an identical copy of a particular physical processing element. For example, if the device 110 is a DMA logic device, each of the physical instances 116-1 to 116-5 may comprise a data mover (e.g., physical logic for data moving operations). In another example, if the device 110 comprises a network interface card (NIC), each of the physical instances 116-1 to 116-5 may comprise an identical network processing element. A physical instance comprises a small area of physical storage (e.g., one or more registers) as well as logic gates and/or other resources for executing operation(s) and performing a desired task. This is where manipulation, change and work can be done on data from a virtual context that is loaded into the physical instance. In one example, operations and updates to discrete state elements can be made within a single clock cycle when the virtual context is loaded into the physical instance.

In one example, the device 110 is specifically designed for servicing multiple virtual machines 150. Accordingly, device 110 includes memory 112 for storing data of various virtual contexts. Notably, each of a plurality of virtual machines 150 that may require access to and usage of device 110 may be assigned a different virtual context. In FIG. 1, memory 112 is illustrated as storing eight virtual contexts. However, the present disclosure is not limited to any particular number of virtual contexts. Thus, in one example the potential number of virtual contexts is limited only by the number of virtual machines 150 that may request access to and use of device 110 and/or or by the size of the memory 112. In one example, the memory 112 comprises a dense memory. For instance, memory 112 may comprise static random access memory (SRAM).

In one example the shared resource hardware device 110 comprises a programmable logic device (PLD), such as an application specific integrated circuit (ASIC) or a field programmable gate array (FPGA). However, in another example the shared resource hardware device 110 may comprise custom physical logic circuitry and memory, e.g., a dedicated integrated circuit (IC) for a particular application. In one example, device 110 may be entirely implemented as a programmable logic device. However, in another example, only one or more of the memory 112, scheduler 114 and physical instances 116-1 to 116-5 is implemented as a programmable logic device. For example, in the case where device 110 is implemented in an FPGA, memory 112 may comprise block random access memory (BRAM) whereas each of the physical instances 116-1 to 116-5 is implemented in look-up tables (LUTs). In another example where memory 112 is implemented in an ASIC, memory 112 may comprise a data path memory, whereas each of the physical instances 116-1 to 116-5 is implemented in random logic circuits.

In one example, a virtual context stores all data, e.g., session descriptors, session data, state data, etc., required for device 110 to service the needs of a particular virtual machine that is assigned to the particular virtual context. For example, the virtual context may store head register data, control and status register (CSR) data, intermediate state data and so forth. Notably, current I/O devices may store similar data for fulfilling requests from external components of a computing system. However, this information is typically cached in the registers of the physical logic. In contrast, the information of the virtual context is only cached in the physical logic (e.g., in physical instances 116-1 to 116-5 of the present disclosure) when the virtual context has access to one of the physical instances. At all other times, the virtual context data is stored in the memory 112.

In one example of the present disclosure, the number of available physical instances in device 110 is less than the number of virtual contexts that may require access to such physical instances. For instance, memory 112 for storing the virtual contexts may comprise dense memory such as BRAM, whereas the physical instances may be implemented as look-up tables (e.g., where the device 110 is implemented as an FPGA). Notably, BRAM may be an order of magnitude or more denser than LUTs. For example, in some cases BRAM may be at least 40 times more dense than LUTs. Similarly, where device 110 comprises an ASIC, memory 112 may comprise a data path memory, which is far denser than the random logic portion of the ASIC that may be used to implement the physical instances. Thus, a far greater number of virtual machines may access the shared resource device 110 than the number of physical instances. For example, Peripheral Component Interconnect Express (PCIe) has defined a Shared Resource Input Output Virtualization (SRIOV) standard which provides for sharing of up to 64 and potentially 256 different virtual machines/virtual contexts. The resources required to provide a physical instance to each of the virtual machines is enormous. In contrast, the use of dense memories with a smaller number of shared physical instances in less dense logic circuits provides robust support for a potentially large number of virtual machines while at the same time conserving space on-chip.

The scheduler 114 is responsible for scheduling access to and usage of physical instances 116-1 to 116-5 among the different virtual contexts and associated virtual machines 150. Each of the physical instances 116-1 to 116-5 may include one or more registers for storing relevant data of a virtual context which is currently assigned to the physical instance. However, when the virtual context is finished accessing the physical instance, the physical instance needs to be freed to service another virtual context. Accordingly, the scheduler 114 may retrieve a virtual context from the memory 112, load the virtual context into an available physical instance 116-1 to 116-5 (e.g., load the relevant data of the virtual context into the registers of the physical instance) and then write the virtual context back to the memory 112 when the virtual context is finished with the physical instance. The physical instance may perform operations which receive new data for the virtual context, change the present data, and so forth. Thus, the scheduler may write the virtual context data back into the memory 112, e.g., replacing the existing data with the updated data after processing by the physical instance.

In one example, scheduler 114 and/or another component of device 110 notifies the virtual machine associated with the virtual context that the virtual context has been stored, or saved back in the memory 112. Accordingly, this notification signals to the virtual machine that there may be available new/updated/modified data associated with the virtual context. As such, the virtual machine may then choose to directly access the memory location in memory 112 to retrieve the new/updated/modified data. It should also be noted that in some cases, e.g., read operations or other operations which do not require state changes, there may be no need to load the virtual context into a physical instance. In other words, some operations may be performed simply by reading from the memory 112.

The scheduler 114, in one example, comprises an on-chip processor, e.g., an embedded microprocessor or microcontroller and/or a hardware state machine, for executing a replacement/sharing algorithm for assigning and scheduling virtual contexts to physical instances. The scheduler 114 may thus include its own internal or external random access memory and/or read only memory for storing and executing instructions. For example, the scheduler may take the form of computing device 300 of FIG. 3, described below, and may include a processor and memory for storing instructions for executing such an algorithm. In another example, device 110 is implemented entirely as a programmable logic device (PDL), e.g., as an ASIC, FPGA, etc. Thus, scheduler 114 may simply comprise a portion of the configurable logic.

As mentioned, each of the virtual contexts may be assigned to and associated with a different virtual machine 150. In particular, computing system 100 may implement a hypervisor 120, or virtual machine manager (VMM), in accordance with various virtualization schemes, e.g., a bare-metal hypervisor, a hosted hypervisor, a hypervisor for paravirtualization, and so forth. In one example, a virtual machine may comprise a guest operating system, e.g., guest OS's 131-135 which may have running thereon respective applications 141-145 that seek to utilize device 110. A virtual machine may also comprise a standalone application (or bare-metal application) which does not run in operating system space, e.g., applications 151-153.

In any case, device 110 may receive requests to process information from any one of virtual machines 150. For example, the scheduler 114 may receive such a request from application 151 and schedule an access by a virtual context associated with application 151 to one of the physical instances to perform the function(s) to fulfill the request. Alternatively, or in addition, device 110 may receive requests to process information on behalf of one of virtual machines 150 from a different component of computing system 100 or from an external device. For example, if device 110 is a network interface card, a communication that is directed to application 141 on guest OS 131 may be received at computing system 100 from somewhere external to computing device 100. This may require that a virtual context associated with application 141/guest OS 131 be loaded into a physical instance of the network interface card for processing.

In previous approaches, each virtual machine/guest that seeks to utilize a piece of hardware sends requests to the hypervisor, which then controls contention among the different virtual machines and presents a single input/output stream to the underlying hardware. Some newer approaches permit direct access by virtual machines to the underlying hardware in certain instances. For instance, a virtual machine may be granted permission to directly perform read operations from storage, or to access a subset of transceiver ports assigned to the virtual machine, among other examples.

In addition, various mechanisms are currently employed to insulate different virtual machines from one another. For example, one virtual machine may be assigned a particular memory range, while another virtual machine may be assigned a different non-overlapping memory range. Each virtual machine is restricted to its own memory location and thus will not interfere with the read/write operations of the other virtual machines. In some cases, direct access by a virtual machine to underlying hardware requires awareness on the part of the virtual machine that it is operating in a shared environment. For instance, some direct access approaches still involve contention among different virtual machines to resolve or avoid conflicts, which in some cases may involve semaphoring via the hypervisor.

In the present disclosure, at least some awareness of virtualization is required of the virtual machines 150. Similarly, the shared resource computing device 110 and computing system 100 are specifically designed for virtualization. Accordingly, in one example the only role of the hypervisor 120 with respect to the present disclosure may comprise assigning virtual contexts from device 110 to the different guests/virtual machines 150. For example, hypervisor 120 may notify device 110 of a new virtual machine that is seeking to utilize device 110. Device 110 may provide a new or unassigned virtual context to the hypervisor 120, e.g., by providing a pointer or link to a memory location where the virtual context is or will be stored. The hypervisor 120, in turn may then pass the pointer or link to the requesting virtual machine. Thereafter, the virtual machine may directly access the appropriate location for the assigned virtual context in memory 112 without having to pass communications through the hypervisor 120. It should be noted that the communications from device 110 to the virtual machines 150 may similarly bypass the hypervisor 120.

As mentioned above, in different examples, a desired number of physical instances may be selected at the design stage depending upon different parameters such as the cost, the number of anticipated virtual machines 150 sharing the physical instances, and so forth. In one example, the number of physical instances is selected such that a bus is saturated when each of the physical instances is in use. For example, if the device 110 is a DMA device for direct memory access and the interface between device 110 and the memory is an eight lane wide bus, at most eight physical instances may utilize the bus at any one time. If there are 12 physical instances, still a maximum of only eight will simultaneously be able to utilize the bus.

However, in one example several extra physical instances may be provided as part of the design. For example, with an eight lane wide bus, at most eight physical instances may utilize the bus at any one time. However, even at times of high demand several of the physical instances may not be accessing the bus at a particular time, e.g., due to storing a virtual context back to dense memory and loading a new virtual context into the physical instance. Thus, several extra physical instances may be provided to give a total of 10-11 physical instances. In the case where device 110 comprises an FPGA, it is possible to change the number of physical instances on device 110 by resetting the system and loading a new image where a greater or lesser number of physical instances are provided. In addition, in one example the number of physical instances is selected at the design stage based upon an anticipated maximum utilization requirement or based upon the limits imposed by the size of a communication bus.

However, in times of low demand, in order to conserve resources, one or more of the physical instances may be taken offline and de-powered. In other words, the scheduler 114, or another component of device 110 may switch off a power signal to at least one of the physical instances when a number of requests for access to a physical instance is below a threshold. In another example, the number of physical instances receiving power may be modified based upon the time of day, e.g., anticipating low demand at night and high demand during the day. Thus, there is a tradeoff between availability and energy use. However, there is an upper bound of physical resources, which are built into the system.

In one example, the scheduler 114 implements a sharing program or algorithm to determine which virtual contexts/ virtual machines 150 may access the physical instances 116-1 to 116-5 at a particular time. For example, the scheduler 114 may take into account various parameters such as: the time at which a particular request is received (e.g., in relation to other unfulfilled requests); a frequency of previous accesses for a virtual context (for example, a virtual context that has heavily utilized the physical instances in a recent time frame may be given a lower priority than a virtual context that has sent no or only a few requests in the recent time frame); a priority associated with the request (for example, a system operator may permit the use of priority flags that are included with requests); and, a priority associated with the virtual context (for example, a system operator may provide greater priority for one guest/virtual machine over another virtual machine).

The scheduler may also account for an anticipated duration of the access. For example, a relatively large number of clock cycles or other measure of time, broadly referred to herein as time slots, may be required in order to fulfill the request. Thus, the request may be delayed until a large block of time slots can be reserved on a single physical instance. Alternatively, or in addition the request can be assigned to non-contiguous time slots on the same or even on different physical instances in order to not tie up resources and to ensure that all pending requests have a fair opportunity to receive prompt scheduling.

The scheduler 114 may similarly account for idleness, a number of pending requests to access a physical instance, a number of physical instances that are currently occupied, and/or a number of physical instances that are scheduled to be occupied. For example, in periods of low demand, the scheduler 114 may assign a single virtual context to occupy a physical resource for many contiguous time slots, whereas the algorithm may cause the scheduler 114 to spread requests out over different non-contiguous time slots when there is greater present and/or anticipated demand. In still another example, the scheduler 114 may implement a back-off policy to determine when a virtual context should be backed-off a physical resource if it has been using it for a very long time. For example, the virtual context may be assigned to a physical instance for an unspecified duration, but if demand increases, the scheduler 114 may then back-off the virtual context and store it to the memory 112 to allow other virtual contexts to access the physical instance. In any case, there is an overhead associated with substituting virtual contexts so there is always a tradeoff between fairness and efficiency.

Figure 2:
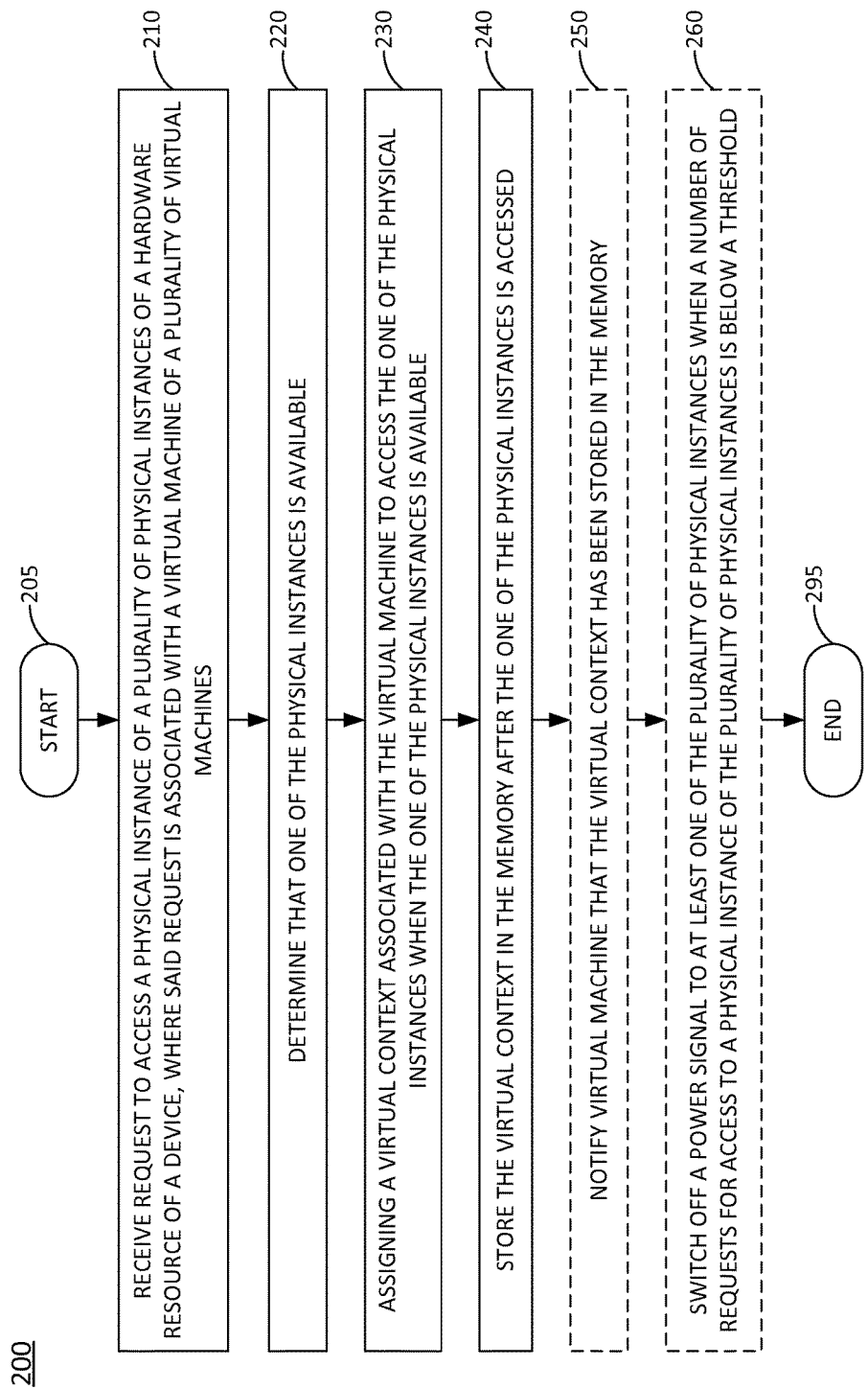
FIG. 2 illustrates a block diagram of a method for providing access by a virtual context to a physical instance.

FIG. 2 illustrates a block diagram of an exemplary method 200 for providing access by a virtual context to a physical instance according to the present disclosure. For example, any one or more of the steps, operations or functions of the method 200 may be implemented by a general purpose computer having a processor, a memory, etc. as illustrated below in FIG. 3, specifically programmed to perform the steps, functions and/or operations of the method. In one example, method 200 is performed by a scheduler, e.g., a processor of a shared resource hardware device. Thus, for illustrative purposes, the method 200 is described below as being performed by a processor. The method 200 starts at step 205 and proceeds to step 210.

In step 210, the processor receives a request to access a physical instance of a plurality of physical instances of a hardware resource of a device. In one example, the processor comprises a microprocessor or microcontroller that is embedded in the device. In one example, the device may comprise a shared resource hardware device which has a plurality of identical copies of a physical instance. The request may be received from one of a plurality of virtual machines that share a computing system on which the shared resource hardware device resides. Alternatively, the request may be received from another device or component that is internal or external to the computing system, where the request pertains to one of the virtual machines. For example, incoming data addressed to a virtual machine may require processing prior to passing the data to the virtual machine.

In step 220, the processor determines that one of the plurality of physical instances is available. In one example, the processor may maintain schedules for each physical instance that is available. The schedules may comprise sequences of time slots, with an indication for each time slot as to whether the time slot is available or reserved, and if reserved, a notation of a virtual context that is assigned to the time slot. Thus, the processor may select a physical instance having at least one time slot that is presently available or that will be available at a later time.

In step 230, the processor assigns a virtual context associated with and/or assigned to the virtual machine to access the physical instance that is determined at step 220. For example, the processor may retrieve the virtual context from a memory and load the virtual context into registers or other temporary storage of the physical instance at a time slot when the physical instance is determined to be available. In one example, the processor may arbitrate among different requests that are simultaneous or close in time. For example, there may be five physical instances on a shared resource hardware device while there are ten pending requests to access the physical instances. Thus, at best, only five of the requests may be immediately fulfilled, while at least five of the requests must be postponed. If any of the physical instances is presently occupied, even more of the requests must be postponed.

The processor may implement a replacement/sharing algorithm with various criteria or rules to determine the priority or order in which requests are fulfilled, which virtual contexts to load into physical instances, which virtual contexts to back-off of the physical instances, and so forth. As just one example, a virtual context that has heavily utilized the physical instances in a given recent time period may be given a lower priority than a virtual context that has been associated with few recent requests to access a physical instance. In one example, the virtual context is assigned to the selected physical instance for a particular duration of time, e.g., a designated number of one or more time slots. Notably, the request may require a greater duration to complete, but due to fairness criteria or other criteria, less than the required number of time slots may be presently available to assign to the virtual context. In another example, the virtual context may be assigned non-contiguous time slots with the same or different physical instances. Various other criteria are described above in connection with the functions of scheduler 114 of FIG. 1.

At step 240, the processor stores the virtual context in the memory after the selected physical instance is accessed by the virtual context. For example, the physical instance may comprise real logic gates for performing operations on and manipulating data values of the virtual context. When the operations are completed, or when the time allotted to the virtual context for accessing the physical instance expires, the processor may write the virtual context back to the memory with the new, modified or updated data values. Thus, the selected physical instance is now free to service another request and have loaded therein another virtual context.

At optional step 250, the processor notifies the virtual machine associated with the request that the virtual context has been stored in the memory. Accordingly, this signals to the virtual machine that there may be available new/updated/modified data associated with the virtual context. As such, the virtual machine may then choose to directly access the memory location in the memory to retrieve the new/updated/modified data.

At optional step 260, the processor switches off a power signal to at least one of the plurality of physical instances when a number of requests for access to a physical instance of the plurality of physical instances is below a threshold. For example, in times of low demand, in order to conserve resources, one or more of the physical instances may be taken offline and de-powered.

Following step 240, step 250, or step 260, the method 200 proceeds to step 295, where the method ends.

It should also be noted that although not explicitly specified, one or more steps of method 200 may include storing, displaying, and/or outputting steps as required for a particular application. In other words, any data, records, fields, tables, and/or intermediate results discussed in the method can be stored, displayed, and/or outputted to another device as required for a particular application. Furthermore, steps, operations or blocks in FIG. 2 that recite a determining operation or involve a decision do not necessarily require that both branches of the determining operation be practiced. In other words, one of the branches of the determining operation can be deemed as an optional step.

FIG. 3 depicts a high level block diagram of a general purpose computer, a computing device, or a computing system 300 suitable for use in performing some or all of the functions described herein. As depicted in FIG. 3, the system 300 comprises a processor element 302 (e.g., a CPU), a memory 304, e.g., a random access memory (RAM) and/or a read only memory (ROM), a module 305 for providing access by a virtual context to a physical instance, and various input/output devices 306 (e.g., storage devices, including but not limited to, a memory device, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

The present disclosure can be implemented in a combination of software and hardware, e.g., using application specific integrated circuits (ASIC), a PLD such as a FPGA, a general purpose computer or any other hardware equivalents such as microprocessors. In one example, the present module or process for providing access by a virtual context to a physical instance can be loaded into memory 304 and executed by processor 302 to implement the functions as discussed above (e.g., according to the method 200). As such, the present module or process 305 for providing access by a virtual context to a physical instance (including associated data structures) of the present disclosure can be stored on a non-transitory computer readable storage medium, e.g., RAM memory, magnetic or optical drive or diskette and the like.

The present disclosure may also be implemented in whole or in part by a tunable IC, e.g., a PLD and/or FPGA. More specifically, a programmable logic device (PLD) is a general-purpose device that can be programmed by a user to implement a variety of selected functions. One type of PLD is a Field Programmable Gate Array (FPGA), which typically includes an array of configurable logic blocks (CLBs) and a plurality of input/output blocks (IOBs). The CLBs are individually programmable and can be configured to perform a variety of logic functions on a few input signals. The IOBs can be configured to drive output signals from the CLBs to external pins of the FPGA and/or to receive input signals from the external FPGA pins. The FPGA also includes a programmable interconnect structure that can be programmed to selectively route signals among the various CLBs and IOBs to produce more complex functions of many input signals. The CLBs, IOBs, and the programmable interconnect structure are programmed by loading configuration data into associated memory cells that control various switches and multiplexers within the CLBs, IOBs, and the interconnect structure to implement logic and routing functions specified by the configuration data to implement a user design in the FPGA. An FPGA may also include other programmable and non-programmable resources. As such, the devices and/or algorithms shown and described above in connection with FIGS. 1 and 2 may be implemented in a plurality of CLBs that perform equivalent logic operations of any one or more components of device 100 and/or steps, functions or operations of the method 200. In one example, the computing device 300 may generate the necessary configuration data/instructions to configure an FPGA to perform the various functions as disclosed above.

While the foregoing describes various examples in accordance with one or more aspects of the present disclosure, other and further examples in accordance with the one or more aspects of the present disclosure may be devised without departing from the scope thereof, which is determined by the claims that follow and equivalents thereof. Claims listing steps do not imply any order of the steps. Trademarks are the property of their respective owners.

What is claimed is:

1. A method of providing access to a hardware device in a computing system among a plurality of virtual machines managed by a hypervisor executing in the computing system, the method comprising:
   receiving, at a processor of the hardware device, a request to access a physical instance of a plurality of physical instances of a hardware resource of the hardware device, wherein the hardware device includes a memory and the plurality of physical instances, and each physical instance of the plurality of physical instances includes a logic gate and a physical storage that is separate from the memory;
   wherein the request is associated with a virtual machine of the plurality of virtual machines;
   determining, at the processor of the hardware device, that one of the plurality of physical instances is available; and
   assigning, by the processor of the hardware device, a virtual context associated with the virtual machine to access the one of the plurality of physical instances when the one of the plurality of physical instances is available;
   wherein the assigning comprises retrieving, by the processor of the hardware device, the virtual context from the memory of the hardware device, loading the virtual context into the physical storage of the one of the plurality of physical instances to enable logic of the one of the plurality of physical instances to manipulate a data value of the virtual context, and moving, by the processor of the hardware device, the virtual context from the physical storage of the one of the plurality of physical instances into the memory when the logic of the one of the plurality of physical instances is not manipulating a data value of the virtual context.

2. The method of claim 1, wherein the request is received at the processor of the hardware device from the virtual machine.

3. The method of claim 1, further comprising:
   notifying, by the processor of the hardware device, the virtual machine that the virtual context has been stored in the memory.

4. The method of claim 1, wherein:
   the virtual context is one of a plurality of virtual contexts; and
   a number of the plurality of virtual contexts is greater than a number of the plurality of physical instances of the hardware resource.

5. The method of claim 1, wherein each virtual context of the plurality of virtual contexts is assigned to one of the plurality of virtual machines.

6. The method of claim 5, wherein each virtual machine of the plurality of virtual machines accesses the hardware device without passing communications via the hypervisor.

7. The method of claim 1, wherein the assigning is based on at least one of:
   a time at which the request is received;
   a frequency of previous accesses for the virtual context;
   a priority associated with the request;
   a priority associated with the virtual context; or
   an anticipated duration of the access.

8. The method of claim 1, wherein the assigning is based on at least one of:
   a number of pending requests to access physical instances of the plurality of physical instances;
   a number of the plurality of physical instances that are currently occupied; or
   a number of the plurality of physical instances that are scheduled to be occupied.

9. The method of claim 1, further comprising:
   switching off a power signal to at least one of the plurality of physical instances when a number of requests for access to physical instances of the plurality of physical instances is below a threshold.

10. A device, comprising:
    a processor;
    a memory;
    a plurality of physical instances of a hardware resource, each of the plurality of physical instances including a logic gate and a physical storage that is separate from the memory;
    a computer-readable medium storing instructions which, when executed by the processor, cause the processor to perform operations, the operations comprising:
       receiving a request to access a physical instance of the plurality of physical instances of the hardware resource;
       wherein the request is associated with a virtual machine of a plurality of virtual machines;

determining that one of the plurality of physical instances is available;

assigning a virtual context associated with the virtual machine to access the one of the plurality of physical instances when the one of the plurality of physical instances is available;

wherein the assigning comprises retrieving the virtual context from the memory, loading the virtual context into the physical storage of the one of the plurality of physical instances to enable logic of the one of the plurality of physical instances to manipulate a data value of the virtual context, and moving the virtual context from the physical storage of the one of the plurality of physical instances into the memory when the logic of the one of the plurality of physical instances is not manipulating a data value of the virtual context.

11. The device of claim 10, wherein the request is received from the virtual machine.

12. The device of claim 10, wherein the operations further comprise:

notifying the virtual machine that the virtual context has been stored in the memory.

13. The device of claim 10, wherein:

the virtual context is one of a plurality of virtual contexts; and a number of the plurality of virtual contexts is greater than a number of the plurality of physical instances of the hardware resource.

14. A device, comprising:

a plurality of physical instances of a hardware resource, wherein each physical instance of the plurality of physical instances includes a logic gate and a physical storage for temporarily storing one of a plurality of virtual contexts when logic of the physical instance is manipulating a data value of the one of the plurality of virtual contexts;

a scheduler, for scheduling access to the plurality of physical instances by the plurality of virtual contexts; and a dense memory storing the plurality of virtual contexts when the logic of the physical instance is not manipulating the data value, wherein the dense memory is separate from the physical storage;

wherein each virtual context of the plurality of virtual contexts is assigned to a different virtual machine of a plurality of virtual machines.

15. The device of claim 14, wherein:

the device comprises a direct memory access logic device; and the hardware resource comprises a data mover.

16. The device of claim 14, wherein:

the device comprises a network interface card; and the hardware resource comprises a network processing unit.

17. The device of claim 14, wherein:

the device comprises an application specific integrated circuit;

the plurality of physical instances of the hardware resource comprises random logic; and the memory comprises static random access memory.

18. The device of claim 14, wherein:

the device comprises a field programmable gate array;

the plurality of physical instances of the hardware resource comprises look-up tables; and the memory comprises block random access memory.

* * * * *